(12) United States Patent
Kazuhiro

(10) Patent No.: US 6,188,038 B1
(45) Date of Patent: Feb. 13, 2001

(54) DEVICE FOR REMOVING AN ELECTRODE TIP

(75) Inventor: Tezawa Kazuhiro, Nagoya (JP)

(73) Assignee: Kyokutoh Company, Aichi-Gun (JP)

( * ) Notice: Under 35 U.S.C. 154(b), the term of this patent shall be extended for 0 days.

(21) Appl. No.: 09/470,451

(22) Filed: Dec. 22, 1999

(51) Int. Cl.$^7$ ...................................................... B23K 4/36
(52) U.S. Cl. ...................................... 219/86.8; 219/86.25
(58) Field of Search ................................ 219/86.8, 86.1, 219/86.25; 29/762

(56) References Cited

U.S. PATENT DOCUMENTS

| | | | |
|---|---|---|---|
| 4,794,221 | * | 12/1988 | Takabe et al. ...................... 219/86.8 |
| 4,935,595 | * | 6/1990 | Fuse .................................. 219/86.25 |
| 5,073,692 | * | 12/1991 | Jackson et al. ..................... 219/86.8 |
| 5,387,774 | * | 2/1995 | Boyer et al. ......................... 219/86.8 |
| 5,495,663 | * | 3/1996 | Saito ................................... 29/762 |
| 5,734,141 | * | 3/1998 | Voilmy et al. ....................... 219/86.8 |
| 5,767,474 | * | 6/1998 | Shimada ............................. 219/86.8 |
| 6,049,053 | * | 4/2000 | Shimada ............................. 219/86.1 |

FOREIGN PATENT DOCUMENTS 3-291175 12/1991 (JP) .
4-9285 1/1992 (JP) .

* cited by examiner

Primary Examiner—Clifford C. Shaw
(74) Attorney, Agent, or Firm—Marshall, O'Toole, Gerstein, Murray & Borun

(57) ABSTRACT

Devices and methods for removing an electrode tip from a shaft of a resistance welder by turning the electrode tip. A holding member has a center of rotation with a first hole to receive the electrode tip and a claw disposed adjacent the first hole and mounted for rotation between an engagement position wherein at least a portion of the claw is positioned within the first hole to secure the electrode tip, and a disengagement position wherein the at least a portion of the claw is displaced from the first hole. A turning plate has a center of rotation coincident with the center of rotation of the holding member and defines a second hole at the center of rotation. The turning plate moves the claw from the disengagement position to the engagement position to secure the electrode tip in the first hole when the turning plate rotates in a first direction and to move the claw from the engagement position to the disengagement position to release the electrode tip from the first hole when the turning plate rotates in a second direction opposite the first direction. A brake operatively engages the holding member to substantially secure the holding member against movement during at least a first phase of movement of the claw from the disengagement position toward the engagement position. The holding member turns with the turning plate in the first direction after completion of the first phase of movement to turn the electrode tip.

16 Claims, 10 Drawing Sheets

DEVICE FOR REMOVING AN ELECTRODE TIP

BACKGROUND OF THE INVENTION

1. Field of the Invention

The present invention relates generally to resistance welders, and more particularly, to a device for removing an electrode tip fitted to a tapered shaft of a shank in a resistance welder.

2. Background of the Related Art

As related art devices of this kind, there are a device in which an expandable member or wedge is inserted by force between a shank and an electrode tip for separating the electrode tip from the shank, and a device in which fine impacts are applied to the electrode tip for pulling the electrode tip from the shank. (see Japanese Laid Open Patent No. 3-291175, and Japanese Laid Open Patent No. 4-9285) However, because devices using the expandable member or inserting the wedge by force require disposition of an expandable part or a wedge part between the electrode tip and the shank by inserting the expandable part or the wedge part through an entire length of the electrode tip, and further require provision of a device for holding the removed electrode tip in place near to a fore end of the electrode tip, which causes the portion of the device in the vicinity of the electrode tip to leave a tight space to the shank disposed above and below thereof, employment of a robot becomes difficult. And, the type of devices applying impact suffer from the inconvenience of generating noise as the impacts are applied to the electrode tip repeatedly.

SUMMARY OF THE INVENTION

In accordance with an aspect of the invention, a device is disclosed for removing an electrode tip from a shaft of a resistance welder by turning the electrode tip. The device comprises a holding member having a center of rotation. The holding member defines a first hole sized to receive the electrode tip. The device also includes a claw disposed adjacent the first hole and mounted for rotation between an engagement position wherein at least a portion of the claw is positioned within the first hole to secure the electrode tip within the first hole, and a disengagement position wherein the at least a portion of the claw is displaced from the first hole. Additionally, the device includes a turning plate having a center of rotation coincident with the center of rotation of the holding member. The turning plate defines a second hole at the center of rotation. The turning plate is structured to move the claw from the disengagement position to the engagement position to secure the electrode tip in the first hole when the turning plate rotates in a first direction and to move the claw from the engagement position to the disengagement position to release the electrode tip from the first hole when the turning plate rotates in a second direction opposite the first direction. The device further includes a brake operatively engaging the holding member to substantially secure the holding member against movement during at least a first phase of movement of the claw from the disengagement position toward the engagement position. The holding member turns with the turning plate in the first direction after completion of the first phase of movement to turn the electrode tip.

Preferably, the claw has an axis of rotation and the axis of rotation of the claw is substantially parallel to an axis of the first hole.

In some embodiments, the first phase ends when the claw enters the engagement position.

Preferably, the first and second holes are coincident with the centers of rotation of the turning plate and the holding member.

Preferably, the second hole is sized to receive a portion of the holding member, the holding member includes an end portion projecting from the turning plate, and the brake cooperates with the end portion to apply the braking force to the holding member. In some such embodiments, the brake comprises a pair of brake arms engaging an outer surface of the end portion of the holding member; and a spring biasing the brake arms into frictional engagement with the end portion.

In some embodiments, the first hole has an inner wall and an inner diameter, and the inner diameter is sized such that, when the claw is in the engagement position and engages the electrode tip, a side of the electrode tip frictionally engages a portion of the inner wall. In some such embodiments, grooves are formed in the portion of the inner wall. In some such embodiments, the device includes only one claw and the portion of the inner wall is located opposite the claw.

In some embodiments, the claw comprises at least three claws, and the claws are spaced around the first hole such that, when the claws enter their engagement positions, the electrode tip is secured between the claws.

Preferably, the device includes a motor operatively coupled to the turning plate for rotating the turning plate in at least one of the first and second directions. In some such embodiments, the turning plate includes gear teeth, and the motor is operatively coupled to the gear teeth of the turning plate via at least one intermediate gear.

Preferably, the first hole is positioned to receive the electrode tip from two directions.

In accordance with another aspect of the invention, a device is disclosed for removing an electrode tip from a shaft of a resistance welder by turning the electrode tip. The device includes a holding member defining a first hole. It also includes a claw disposed adjacent the first hole and mounted for rotation between an engagement position wherein at least a portion of the claw is positioned within the first hole to secure the electrode tip within the first hole, and a disengagement position wherein the at least a portion of the claw is displaced from the first hole. The device also includes a turning plate cooperating with the claw to move the claw from the disengagement position to the engagement position to secure the electrode tip in the first hole when the turning plate rotates in a first direction and to move the claw from the engagement position to the disengagement position to release the electrode tip from the first hole when the turning plate rotates in a second direction opposite the first direction. Additionally, the device includes a brake operatively engaging the holding member such that, during a first phase of operation, the holding member does not rotate and the turning plate moves the claw from the disengagement position toward the engagement position, and during a second phase of operation, the holding member rotates with the turning plate to rotate the electrode tip.

In accordance with another aspect of the invention, a method of removing an electrode tip from a shaft of a resistance welder by turning the electrode tip is provided. The method comprises the steps of; inserting the electrode tip into a bore defined in at least one of a turning plate and a holding member; rotating the turning plate in a first direction without rotating the holding member to thereby move at least one claw into engagement with the electrode tip to secure the tip within the bore; and subsequently rotating the turning plate and the holding member in the first direction while the at least one claw secures the electrode tip in the bore to thereby turn the tip.

Preferably, the method also comprises the step of rotating the turning plate and the holding member in a second direction opposite the first direction to release the electrode tip from the bore.

BRIEF DESCRIPTION OF THE DRAWINGS

The accompanying drawings, which are included to provide a further understanding of the teachings of the invention and are incorporated in and constitute a part of this specification, illustrate devices constructed in accordance with the teachings of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The device disclosed herein can be used for removing an electrode tip, and includes a part near to the electrode tip which is made thin such that electrode tips which are fitted in a tight space between shanks can be removed with ease, and noise generation during the work can be prevented.

Figure 1:
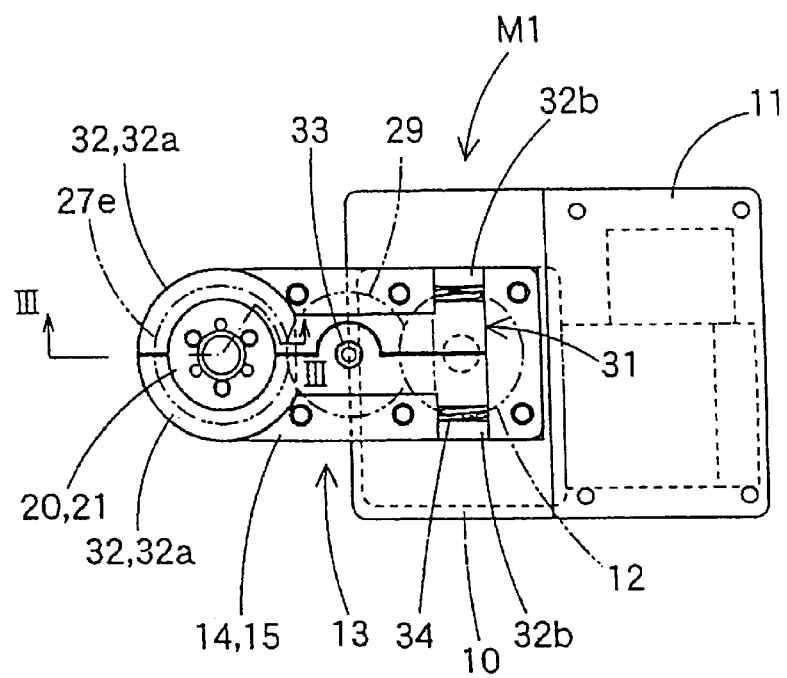
FIG. 1 illustrates a plan view of a first exemplary device for removing an electrode tip.
Figure 2:
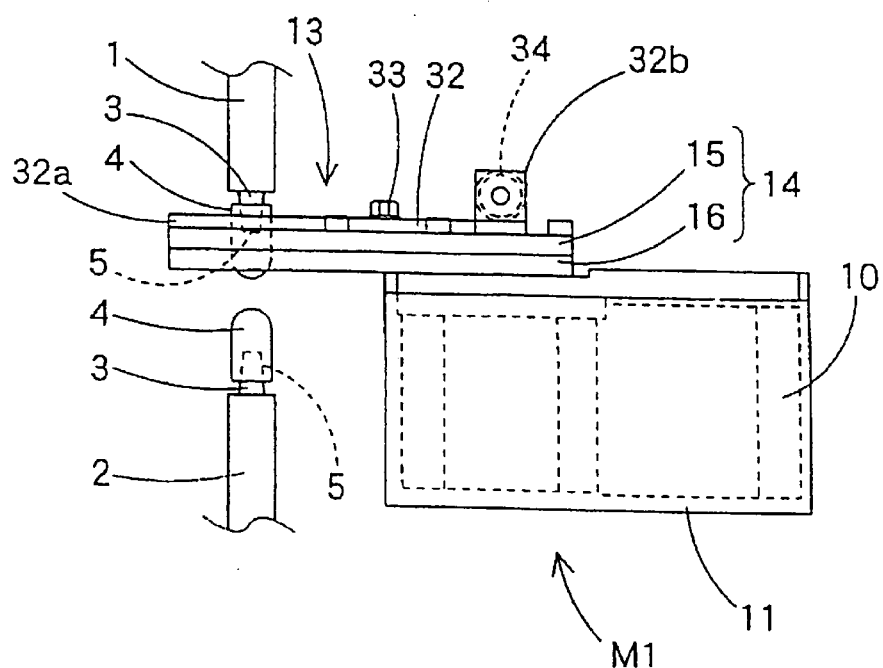
FIG. 2 illustrates a front view of the device of FIG. 1.

A device M1 constructed in accordance with the teachings of the invention for removing an electrode tip is shown in FIGS. 1 and 2. The device M1 is adapted for removing an electrode tip 4 fitted to a shank 1 and 2 of a welding robot as a resistance welder. The device M1 includes a body 10 connected to an arm (not shown) of a working robot, and a fore end 13. The fore end 13 projects from a side of a top surface of the body 10 in a horizontal direction for inserting between the shanks 1 and 2 and for mounting on the electrode tip 4 when the electrode tip 4 is to be removed. The reference numeral 5 denotes a tapered hole of the electrode tip 4 fitted to the tapered shaft 3 of the shanks 1 and 2.

Figure 3:
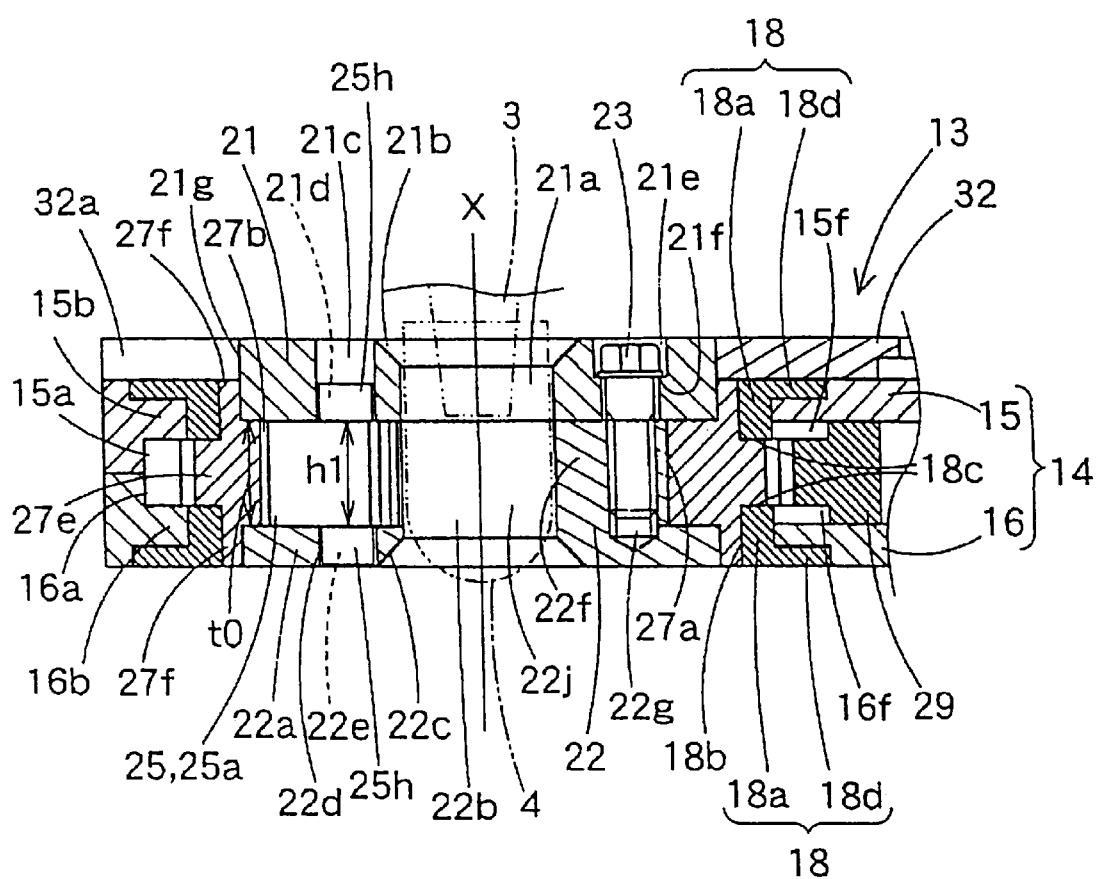
FIG. 3 illustrates an enlarged sectional view taken across line III—III in FIG. 1.

Referring to FIGS. 1–3, the body 10 has a driving motor (not shown) fitted with a reduction gear in a housing 11 for rotating a driving gear 12 (explained later) in a regular or reverse direction. The fore end 13 includes a case 14 fixed to the housing 11, a holding member 20 and a turning plate 27 accommodated in the case 14, a claw 25 held in the holding member 20, an intermediate gear 29 engaged with the driving gear 12 for turning the turning plate 27, and compression rings 18 screwed on top and bottom of the case 14.

Figure 4:
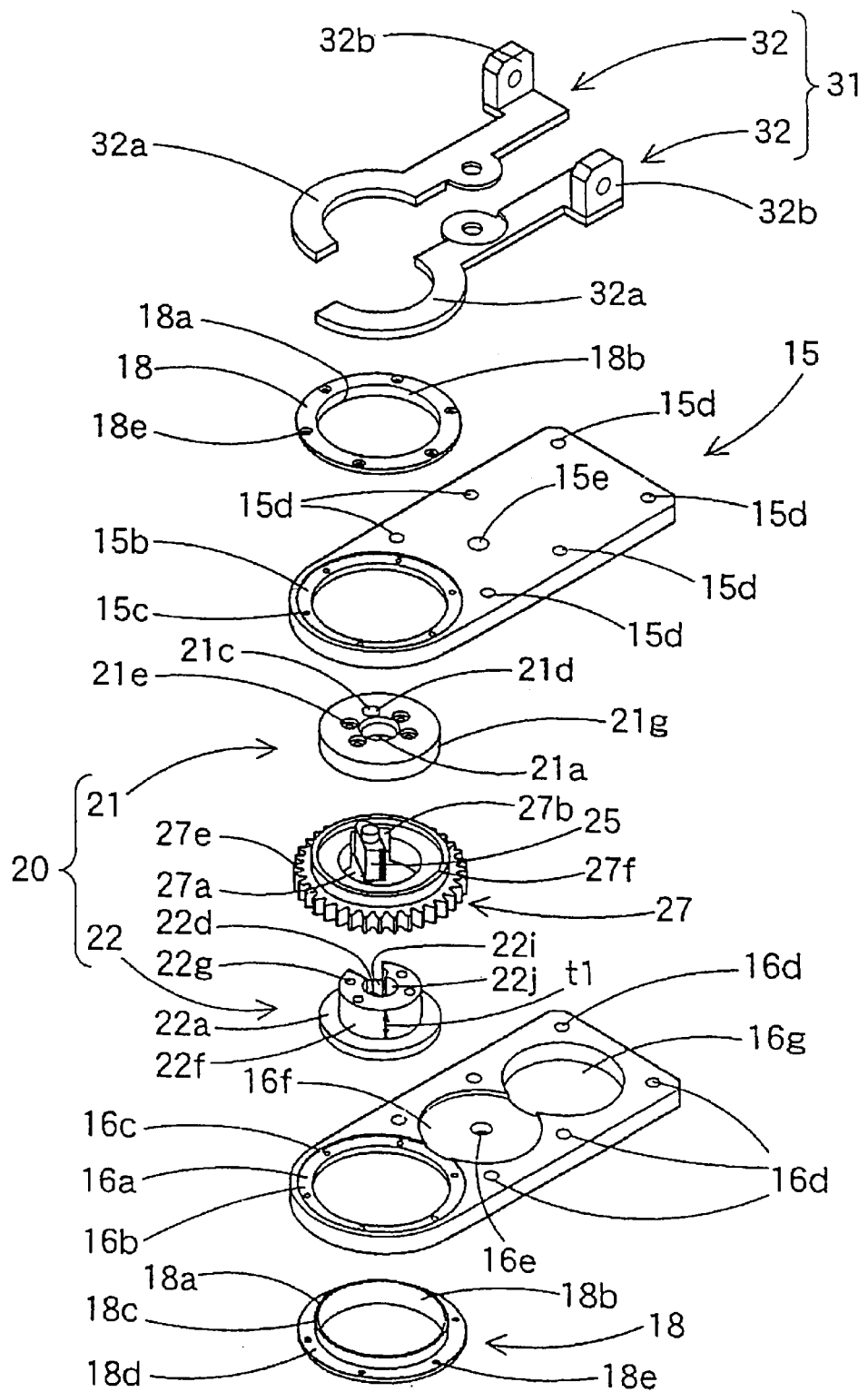
FIG. 4 illustrates an exploded perspective view of the device of FIG. 1.
Figure 5:
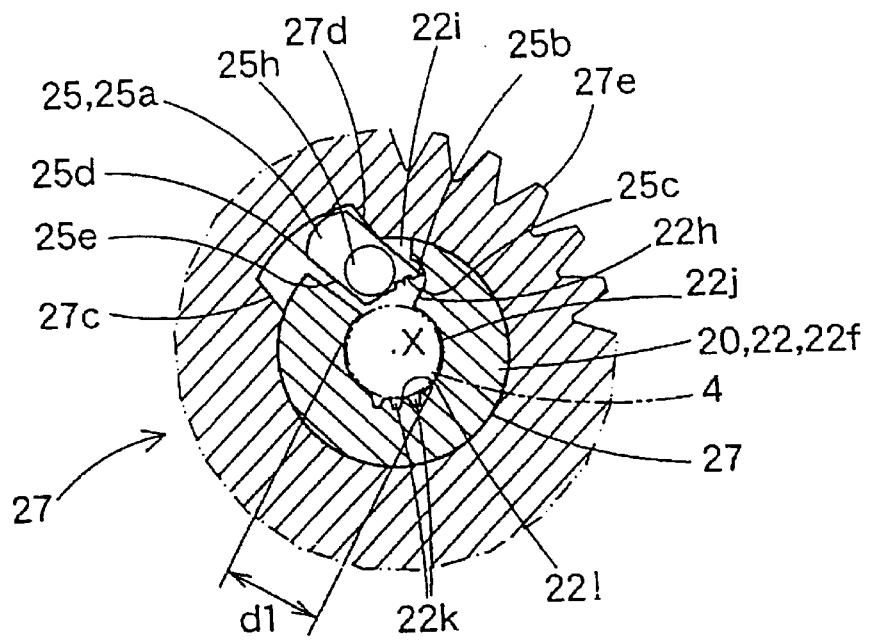
FIG. 5 illustrates a partial cross section of the device of FIG. 1 showing a state immediately before a clockwise turn of the turning plate is made to remove the electrode tip.

Referring to FIGS. 3 and 4, the turning plate 27 has a substantially disk form and includes a hole 27a with an inside diameter which is greater than an outside diameter of the electrode tip 4. The turning plate 27 also includes a gear portion 27e on an outer circumference for engagement with the intermediate gear 29, and cylindrical ribs 27f on top and bottom surfaces thereof. A center of rotation X of the turning plate 27 is provided in an up and down direction at the center of the hole 27a. A recess 27b is formed in an inner circumference of the turning plate 27 for placing the claw 25 therein. As shown in FIG. 5, one side surface of the recess 27b is an engagement pressing surface 27c for turning the claw 25 to an engagement region where a fore end 25b of the claw 25 engages with the electrode tip 4. The claw 25 is turned to the engagement region by turning the turning plate 27 in a regular direction such that the engagement pressing surface 27c engages a convex portion 25d and a side surface 25e of the claw 25. The other side surface of the recess 27d is a disengagement pressing surface 27d for turning the fore end 25b of the claw to a disengagement region in which the fore end 25b of the claw 25 makes no interference with the electrode tip 4. The claw 25 is turned to the disengagement region by turning the turning plate 27 in a reverse direction such that the disengagement pressing surface 27d engages the convex portion 25f and a side surface 25g of the claw 25 (see FIG. 9).

Referring to FIGS. 3–9, the claw 25 includes a body 25a (e.g., a substantially rectangular plate), and a shaft 25h (e.g., a cylindrical column) on top and bottom surfaces of the body 25a. The fore end 25b of the body 25 has a sharp angled form, and a plurality of grooves taking the high friction with the electrode tip 4 into consideration. That is, in the first embodiment, the claw 25 is dimensioned such that its fore end 25b is projected into a pass through hole 22j in the holding member 20 when the claw 25 is turned into the engagement region. The shafts 25h of the claw 25 are disposed parallel to the center of rotation X. The shaft 25h is vertically disposed in a space 22i defined in the rib 22f (which will be explained later) on the holding member 20 in the vicinity of the fore end 25b such that a cross section of the claw 25 is projected from the recess 27b of the turning plate 27 into the hole 27a and into the space 22i defined in the rib 22f. A height h1 of the body 25a (see FIG. 3) is slightly smaller than a thickness T1 (FIG. 4) of the rib 22f on the holding member 20 (which will be explained later).

As shown in FIGS. 3 and 4, the holding member 20 has the same center of rotation X as the turning plate 27. The holding member 20 includes a disk 21, and a disk 22 with a stepped portion. The outside diameter of the disk 21 is dimensioned such that the disk 21 is rotatable in an inner circumference of the rib 27f on a top surface of the turning plate 27. The disk 21 has a pass through hole 21a. The inside diameter of the hole 21a is slightly greater than the outside diameter of the electrode tip 4. The disk 21 has a thickness which is greater than a height of the rib 27f so that an outer circumference of the disk 21 projects from the rib 27f. As explained below, this outer circumference serves as a braking surface 21g for engaging a brake arm 32. The disk 21 also has a tapered surface 21b (see FIG. 3) at an upper edge around the pass through hole 21a to facilitate easy insertion of the electrode tip 4 from above. A holding hole 21c and two pair of fitting holes 21e located on opposite sides of the holding hole 21c are positioned around the pass through hole 21a. Each fitting hole 21e has a smaller inside diameter at a lower portion to form a stepped surface 21f (see FIG. 3).

The disk 22 has a disk portion 22a and a rib 22f projected upward from the disk portion 22a. The outside diameter of the disk 21a is dimensioned such that the disk portion 22a is rotatable in an inner circumference of the rib 27f on a bottom surface of the turning plate 27. The disk 22 has a pass through hole 22b at a center thereof. The pass through hole 22b has an outside diameter which is slightly greater than the electrode tip 4. The disk portion 22a has a thickness equal to a height of the rib 27f. A tapered surface 22c is formed at a bottom side edge of the pass through hole 22b to facilitate easy insertion of an electrode tip from below (see FIG. 3). The disk 22 includes a holding hole 22d adjacent the pass through hole 22b (see FIG. 3). The holding hole 22d is located in vertical alignment with the holding hole 21c in the disk 21. The shafts 25h on the top and bottom of the claw 25 are respectively inserted in these holding holes 21c, 22d. Accordingly, in the illustrated device M1, inside surfaces of the holding holes 21c, 22d in a clockwise direction centered on the rotation center X form rotating action surfaces 21d, 22e which take a torque when the turning plate 27 rotates in a regular direction.

As shown in FIGS. 3–5, the rib 22f has a substantially cylindrical form projected upward from a rim of the pass through hole 22b on a top surface of the disk portion 22a. A space portion 22i is defined in the rib 22f in the holding hole 22d region. The outside diameter of the rib 22f is selected such that the rib 22f can be inserted in the hole 27a in the turning plate 27. As shown in FIG. 5, the rib 22f includes a pass through hole 22j having an inner diameter d1 and an inner circumference which are formed equal to the pass through hole 22b.

There are a plurality of grooves 22k (see FIG. 5) formed in the inner circumference of the pass through hole 22j at a portion opposite to the space portion 22i. The rib 22f has a thickness (height) t1 (see FIG. 4) which is slightly greater than a thickness t0 of an inside circumference of the ribs 27f on the turning plate 27. The rib 22f also has four screw holes 22g on the top surface thereof. These holes 22g are aligned with the fitting holes 21e in the disk 21.

As shown in FIGS. 5–8, a groove 22h is formed in one side surface of the space portion 22i of the rib 22f for preventing interference with the claw 25 until the claw is disposed in the engagement region. The inside diameter d1 of the pass through hole 22j in the holding member 20 is dimensioned such that a portion (i.e., a groove side 22k portion) located opposite to the claw 25 at the inner circumference of the pass through hole 22b is pressed by the outer circumference of the electrode tip 4 when the claw 25 is brought into the engagement region and presses the tip 4. In the illustrated device, the inside diameter d1 of the pass through hole 22j is 17 mm, and an outside diameter of the electrode tip 4 is 16 mm.

As shown in FIGS. 1–4, the case 14 includes an upper case 15 and a lower case 16. Each of the upper case 15 and the lower case 16 has an annular projection 15b, 16b at the fore end side. The inner circumference of the annular projections 15b, 16b form pass through holes 15a, 16a. The pass through holes 15a, 16a correspond to the outside diameter of the gear portion 27e in the turning plate 27. Six screw holes 15c, 16c for bolts (not shown) are formed in each of the annular projections 15b, 16b for fitting the compression rings 18 thereto. Each of the upper case 15 and the lower case 16 has six connection holes 15d, 16d in a periphery of the body 10 for connection to each other. In particular, the connection hole 15d is a simple pass through hole while the connection hole 16d is a threaded hole. Each of the upper case 15 and the lower case 16 has a fitting hole 15e, 16e for fitting a holding bolt 33 for rotatably holding the intermediate gear 29 and a brake arm 32 of a brake device 31 explained later. The fitting hole 15e is a simple pass through hole while the fitting hole 16e is a threaded hole. Recesses 15f (see FIG. 3) and 16f for accommodating the intermediate gear 19 and recesses 15g (not shown) and 16g (see FIG. 4) for accommodating the driving gear 12 are formed in opposite surfaces of the upper case 15 and the lower case 16. The recess 16g forms a pass through hole.

As shown in FIGS. 3 and 4, a compression ring 18 is provided for rotatably accommodating the turning plate 27 within the upper case 15 and the lower case 16. The compression ring 18 includes a cylindrical portion 18a of a size which can be inserted in the inner circumference of the annular projections 15b, 16b on the upper case 15 and the lower case 16. It also includes a jaw portion 18d which is formed on an outer circumference of an end portion of the cylindrical portion 18a. Each of the jaw portions 18d has fitting holes 18e which correspond to the threaded holes 15c, 16c in the upper case 15 and the lower case 16. The compression rings 18 are fitted to the upper case 15 and the lower case 16 by bringing the jaw portions 18d into contact with the annular projections 15b, 16b on the upper case 15 and the lower case 16 by means of bolts (not shown) threaded into the threaded holes 15c, 16c via the fitting holes 18e such that end surfaces 18c of the cylindrical portions 18a spaced from the jaw portion 18d are at opposite sides. Each of the fitting holes 18e is provided with a stepped surface in an inside surface for receiving a bolt head to prevent projection of the bolt head when the compression rings 18 are fitted to the upper case 15 and the lower case 16. Thus, when the upper case 15 and the lower case 16 are fitted, each of the compression rings 18 blocks the outer circumference of the cylindrical rib 27f of the turning plate 27 from the inner circumference of the cylindrical portion 18a. Also, when the upper and lower cases 16 are fitted, the top and bottom surfaces of the gear portion 27e of the turning plate 27 between the end surfaces 18c is rotatable under a condition of the turning plate 27.

The braking device 31 includes one pair of brake arms 32 and a compression coil spring 34. Each of the brake arms 32 has a semicircular compression piece portion 32a at a fore end thereof for covering one half of the braking surface 21g on the disk portion 21 of the holding member 20. Each brake arm 30 also includes a spring seat 32b at a far end for disposing the compression coil spring 34 therebetween. A bolt 33 is located at a center portion of the arms 32 for rotably supporting the brake arm 32 on the case 14.

In assembly of the fore end portion 13, the turning plate 27 and the intermediate gear 29 are disposed between the upper and lower cases 15, 16, the compression rings 18 are fitted to the upper and lower cases 15, 16 with bolts (not shown), and bolts are passed through the connecting holes 15d, 16d to connect the upper and lower cases 15 and 16 to each other. Then, the claw 25 is disposed in the recess 27b of the turning plate 27 and, at the same time, the disk 21 and the stepped disk 22 are disposed from top and bottom of the turning plate 27. In detail, the rib 22f is inserted into the pass through hole 27a from below, and at the same time, each of the fitting holes 21e are matched with the threaded holes 22g, and the shafts 25h are inserted into each of the holding holes 21c, 22d. When each of the connecting bolts 23 are threaded into the threaded holes 22g through each of the fitting holes 21e, the disk 21 and the stepped disk 22 are fastened. In other words, the holding member 20 is assembled and is disposed to pass through the turning plate 27. Since the height t1 of the rib 22f of the holding member 20 is slightly greater than the height h1 of the body 25a of the claw 25 and the inside surface thickness t0 of the ribs 27f on the turning plate 27, the claw 25 is rotatably held by the holding member 20 centered on the shafts 25h. The holding member 20 is secured within the case 14 by the rib 27f and the like such that the holding member can make a relative movement with the turning plate 27 by matching the rotation center X with the turning plate 27. The assembly of the fore end portion 13 is completed by fitting the brake arm 32 to the case 14 by using the holding bolts 33, by bringing the compression piece portions 32a into contact with the braking surfaces 21g on the disk 21 of the holding member 20, and by positioning the compression coil spring 34 between the spring seats 32b. It is preferable that, after the fore end portion 13 is assembled, the intermediate gear 29 and the driving gear 12 are engaged, and the fore end portion 13 and the body 10 are assembled.

Figure 6:
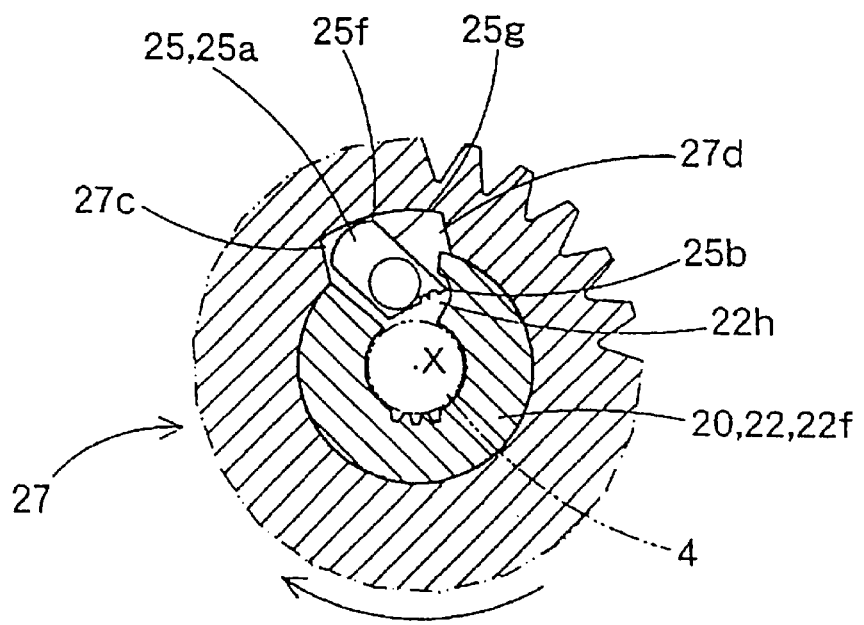
FIG. 6 is a view similar to FIG. 5, but showing a state immediately after a clockwise turn of the turning plate.
Figure 7:
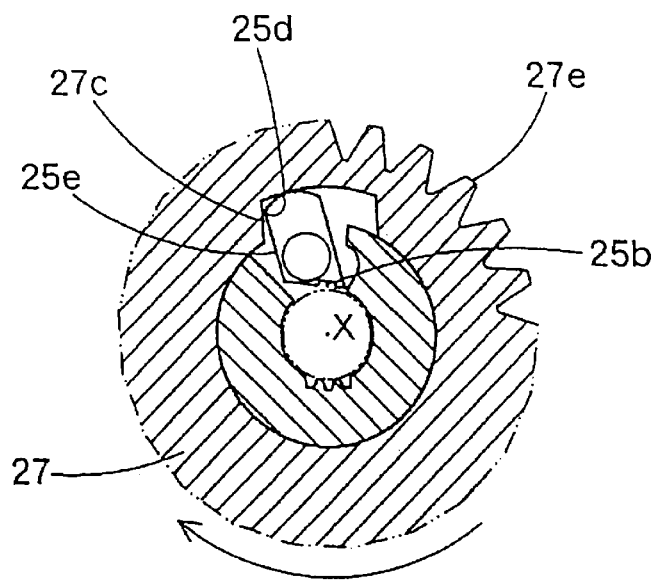
FIG. 7 is a view similar to FIGS. 5 and 6, but showing a state after FIG. 6 in removal of an electrode tip.
Figure 8:
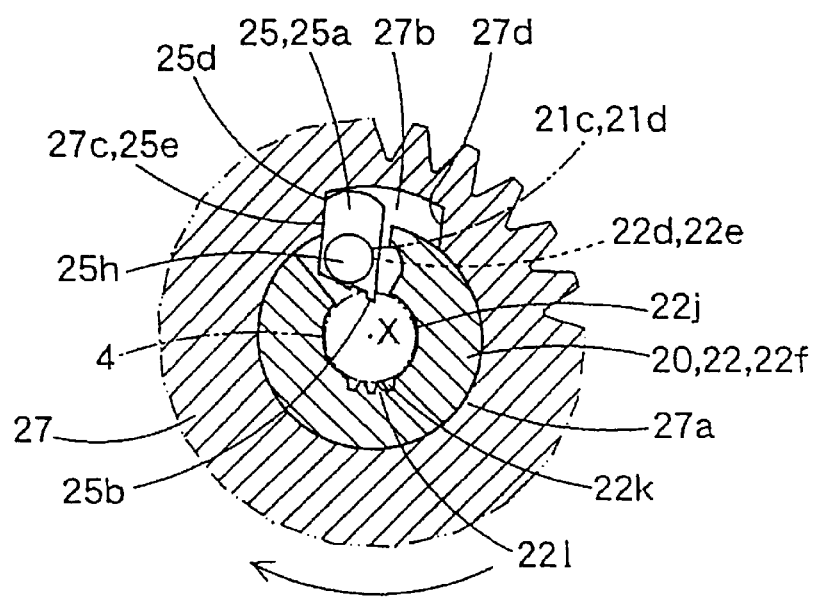
FIG. 8 is a view similar to FIGS. 5 and 6, but showing a state immediately before rotation of a holding member.
Figure 9:
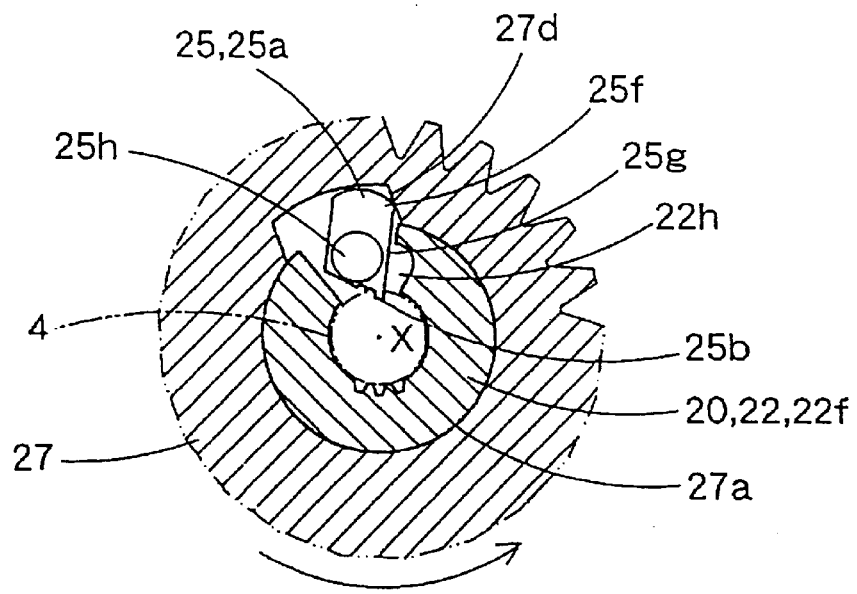
FIG. 9 is a view similar to FIGS. 5 and 6, but showing a state when the turning plate is turned in a reverse direction.
Figure 10:
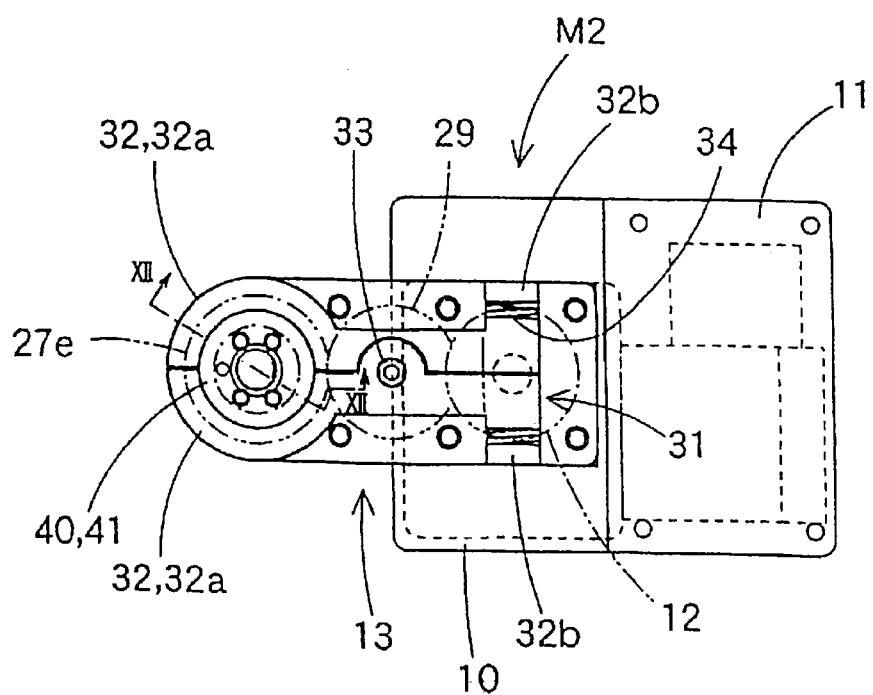
FIG. 10 illustrates a plan view of a second exemplary device constructed in accordance with the teachings of the invention for removing an electrode tip.
Figure 11:
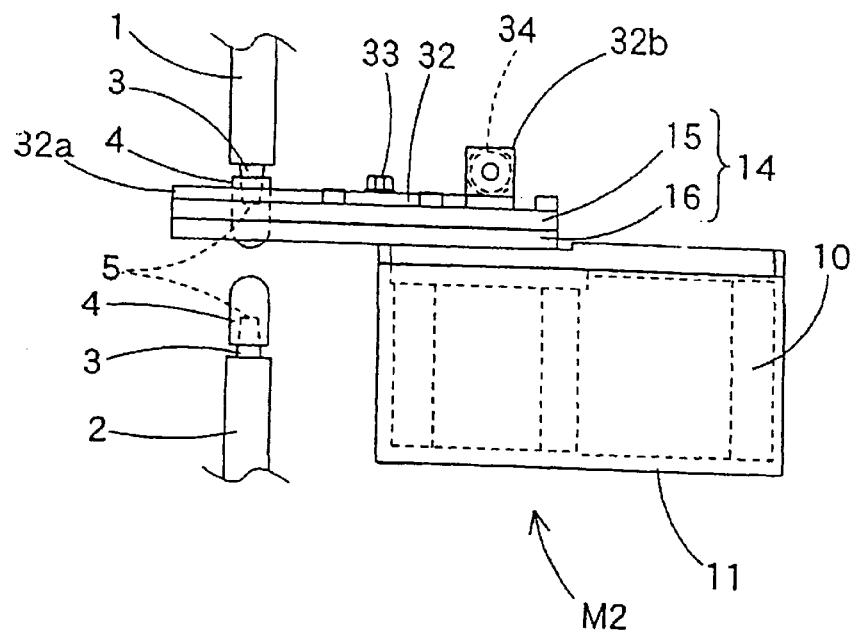
FIG. 11 illustrates a front view of the device of FIG. 10

As shown in FIGS. 5–7, when removing an electrode tip 4, the turning plate 27 is placed around the electrode tip 4 such that the electrode tip 4 is inserted in the pass through holes 21a and 22b in the holding member 20 which is concentric to the pass through hole 27a in the turning plate 27. The driving motor in the body 10 is then driven to turn the turning plate 27 in a clockwise direction with reference to the center of rotation X by using the driving gear 12 and the intermediate gear 29. Then, as shown in FIGS. 5–7, the engagement pressing surface 27c of the turning plate 27 is engaged with the convex portion 25d and side surface 25e of the claw 25 to turn the claw 25 in a clockwise direction taking the shaft as a rotation center. The claw 25 will turn until, as shown in FIG. 8, the claw 25 enters the engagement region where the fore end 25b of the claw 25 engages with the outer circumference of the electrode tip 4, thereby securing the electrode tip 4 in the pass through hole 22j. The electrode tip 4 is engaged with the fore end of the claw 25 with the electrode tip 4 tilted slightly such that the electrode tip 4 presses against the groove portion 22k of the pass through hole 22j. Under this condition, if the turning plate 27 is further rotated in a clockwise direction, the fore end 25b of the claw 25 is directed toward a center direction of the electrode tip 4, making a deeper engagement with the electrode tip 4 with a greater resistance of engagement of the claw 25. When rotation of the claw 25 becomes difficult, a rotation torque applied to the turning plate 27 exerts a force on the rotating action surfaces 21d, 22e which engage the claw 25, so that the holding member 20 is rotated in a clockwise direction together with the turning plate 27 against a resistance of a rotation braking force of the brake arms 32. As the holding member 20 rotates with the claw 25 engaging with the electrode tip 4 held in the pass through hole 22j, the electrode tip 4 is rotated in a clockwise direction with the turning plate 27. Because even a slight rotation of the electrode tip 4 releases the fitting between the tapered shaft 3 of the shank 1 and the electrode tip 4, if the fore end portion 13 is moved downward together with the body 10 from the fore end side of the shank 1, the electrode tip 4 can be removed from the shank 1. After the fore end portion 13 is brought over a collection box, the driving motor in the body 10 is driven in reverse, to cause a reverse rotation of the turning plate 27 and holding member 20 in a counterclockwise direction with reference to the center of rotation X. Then, as shown in FIG. 9, the disengagement pressing surface 27d of the turning plate 27 comes into contact with the convex portion 25f and the side surface 25g of the claw 25. As a result, the claw 25 rotates in a counterclockwise direction about the shaft 25h so that the fore end 25b of the claw 25 releases the electrode tip 4 in the pass through hole 22j, and enters into the disengagement region. Because the electrode tip 4 is released from engagement with the fore end 25b of the claw and, thus, from the compression force into the groove portion 22k in the inner circumference of the pass through hole 22j, the tip 4 is dropped from the pass through hole 22j in the holding member 20 and the pass through hole 27a in the turning plate 27, and the tip 4 falls into the collection box. After reversing the turning plate 27 reduces the engagement resistance of the claw 25, the holding member 20 is no longer rotated because the rotation braking force of the compression piece portions 32a in the brake arms 32 act on the braking surfaces 21g. Continued rotation of the turning plate 27 rotates the claw 25 to the disengagement region. The electrode tip 4 on the lower shank 2 can also be easily collected into the collection box in the same manner as the electrode tip 4 on the upper shank 1 if the fore end portion 13 is brought around the electrode tip 4, the turning plate 27 is rotated in a clockwise direction, the fore end portion is moved to a required position, and the turning plate 27 is reversed.

From the foregoing, persons of ordinary skill in the art will appreciate that the disclosed device M1 can be made slim to permit easy removal of an electrode tip 4 fitted in a tight space between the shanks 1 and 2. Moreover, since what is required in the removal of the electrode tip 4 is a simple engagement of the fore end 25b of the claw 25 with the electrode tip 4, there is no noise of impact, and occurrence of noise during working is suppressed. As described above, the disclosed device has the holding member 20 disposed to pass through the pass through hole 27a in the turning plate 27, the end portion 21g of the disk 21 projects from the turning plate 27, and the rotation braking force applied to the holding member 20 is generated by the brake arms 32 pressing the outer circumference 21g to apply a friction force thereto by using the compression coil spring 34. Accordingly, because the height of the brake arms 32 can be selected to be within the height of the outer circumferences 21g, and because portions of the braking device 31 other than the brake arms 32 can be disposed away from the vicinity of the electrode tip 4, the thickness of the device M1 in the vicinity of the electrode tip 4 can be made slim. This slimness permits easy removal of the electrode tip 4 fitted in the tight space between the shanks 1 and 2. Moreover, as explained above, the inside diameter d1 of the pass through hole 22j in the holding member 20 is dimensioned such that the side portion of the groove portion 22k opposite to the claw 25 in the inner circumference of the pass through hole 22 can be pressed by the outer circumference of the electrode tip 4 when the claw 25 is disposed in the engagement region and presses the tip 4. Accordingly, since the electrode tip 4 is held in the pass through hole 22j in the holding member 20 such that the electrode tip 4 is gripped between two points, (i.e., the fore end 25b of the claw 25 and the groove portion 22k in the inner circumference of the pass through hole 22j in a manner that the fore end 25b of the claw is engaged with the electrode tip 4 only in one side), a stable hold of the electrode tip 4 is possible. Furthermore, because the groove portion 22k is formed in a portion of the inner circumference of the pass through hole 22j opposite to the claw 25 when the claw 25 is disposed in the engagement region, and because a convex portion 22l in a periphery of the groove portion 22k can also be engaged with the electrode tip 4 together with the fore end 25b of the claw when the electrode tip 4 is held, a further stable hold on the electrode tip 4 is possible.

Though the device M1 has a system in which the electrode tip 4 is held by gripping the electrode tip 4 by means of the fore end 25b of the claw and the inner circumference surface of the pass through hole 22j in the holding member 20, a system may also be provided in which the electrode tip 4 is held between the fore end 25b of the claw and the inner circumference of the pass through hole 27a in the turning plate 27 without departing from the scope or spirit of the invention.

Another device M2 constructed in accordance with the teachings of the invention is shown in FIGS. 10–13. In the device M2 shown in FIGS. 10–13, a system is provided in which only the claw 45 holds the electrode tip 4. The device M2 is different from the device M1 in the claw 45, the holding member 40 for holding the claw 45, and the turning plate 47. The upper and lower cases 15 and 16 in the case 14, the compression rings 18, the intermediate gear 29, the brake device 31, the driving gear 12, and the body 10 are the same in both device M1, M2. Therefore explanations of those components will be omitted from the following discussion.

Figure 12:
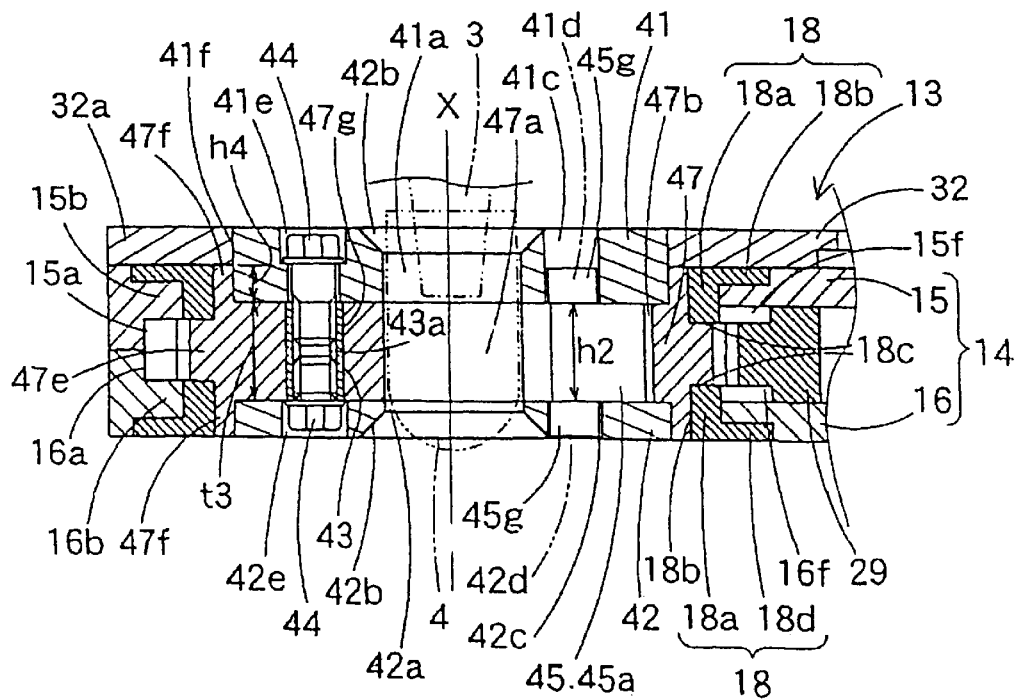
FIG. 12 illustrates an enlarged sectional view taken across line XII—XII of FIG. 10.
Figure 13:
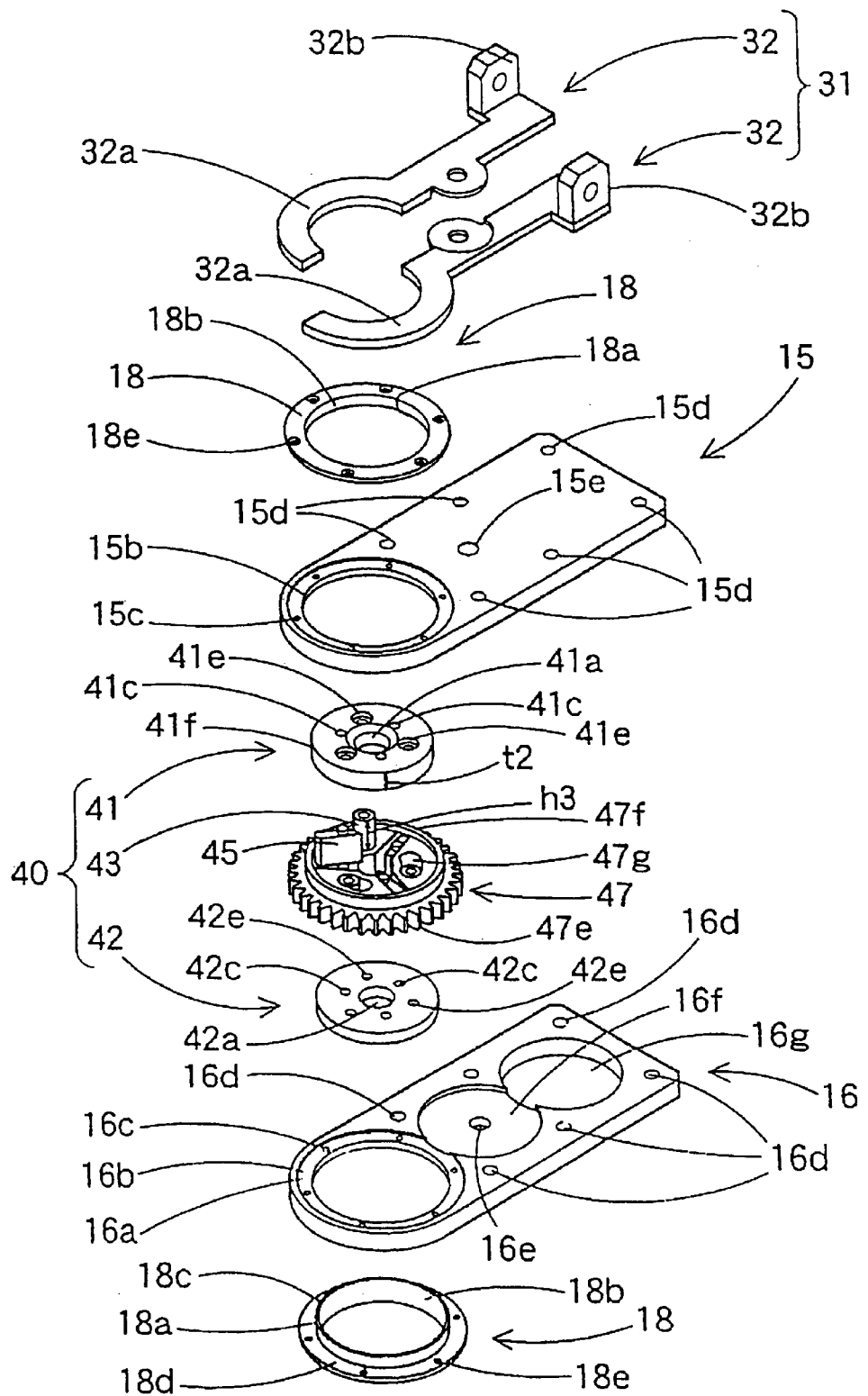
FIG. 13 illustrates an exploded perspective view of the device of FIG. 10.
Figure 14:
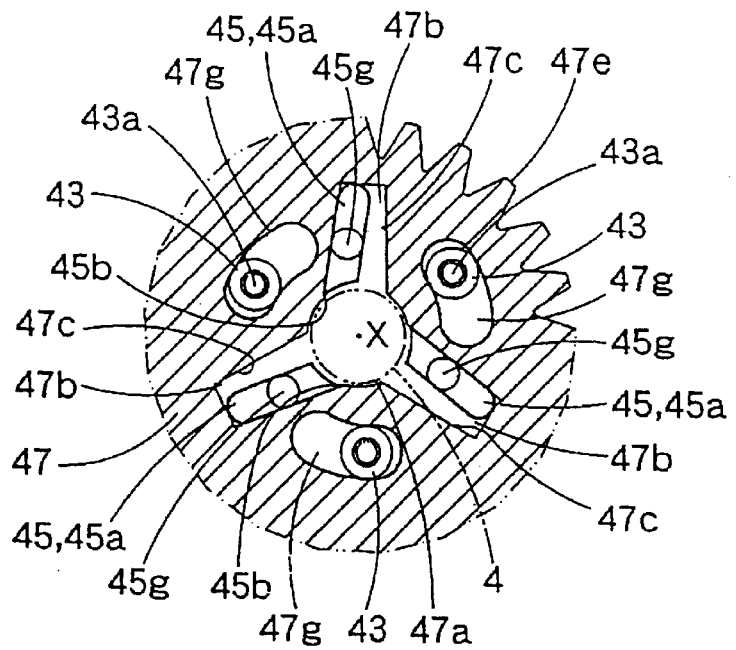
FIG. 14 illustrates a partial cross section of the device of FIG. 10 showing a state immediately before a clockwise turn is made of the turning plate to remove the electrode tip.

Referring to FIGS. 12–14, the turning plate 47 has a substantially disk form. It includes a pass through hole 47a formed in a central portion. The hole 47a has an inside diameter which is slightly greater than an outside diameter of the electrode tip 4. The turning plate 47 also includes a gear portion 47e which is engaged with the intermediate gear 29. The turning plate 47 is disposed in the pass through holes 16a of the upper and the lower cases 15, 16, and is secured in up and down directions for rotation between the cylindrical end portions 18c of the upper and lower compression rings 18. The center of rotation X of the turning plate 47 is set at the center of the pass through hole 47a in up and down directions. The turning plate 47 has annular ribs 47f on top and bottom surfaces for slidably engaging the inner circumferences of the cylindrical portions 18a of the compression rings 18. The pass through hole 47a has three slots 47b for respectively disposing three claws 45 therein. The slots 47b are oriented in a radial direction and spaced in equal angles.

Figure 17:
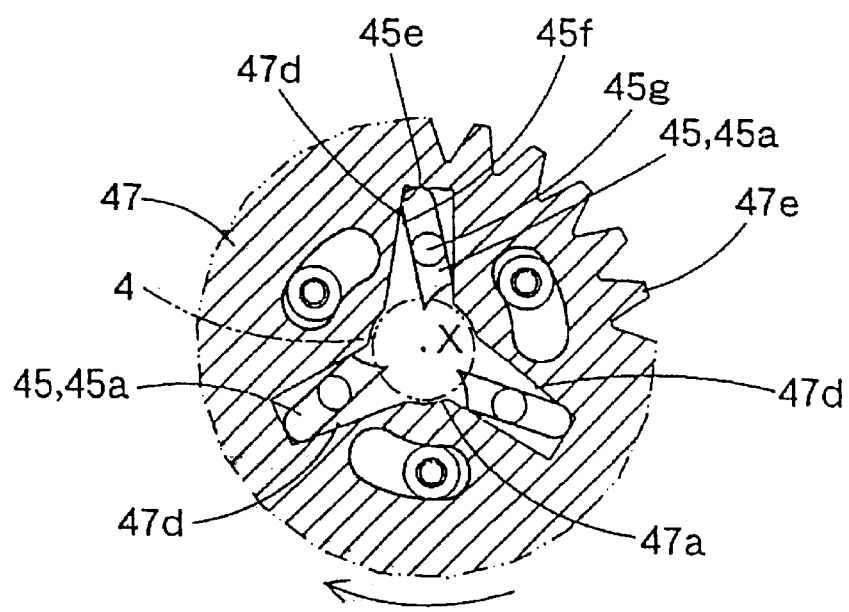
FIG. 17 is a view similar to FIG. 14, but showing a state when the turning plate is turned in a reverse direction.

Each of the slots 47b has an engagement compression surface 47c for engaging the convex portion 45c and the side surface 45d of the claw to rotate the claw 45 until the fore end 45b of the claw is in an engagement region wherein the fore end 45b engages with the electrode tip 4 when the turning plate is turned in a regular (e.g., clockwise) direction. As shown in FIG. 17, the other side surface of the slot 47 is a disengagement compression surface 47d which rotates the fore end 45b of the claw to a disengagement region where no interference with the electrode tip 4 occurs by pressing the convex portion 45e and the side surface 45f of the claw 45 when the turning plate 47 reverses.

The turning plate 47 has these guide holes 47g of a circular arc form centered on the rotation center X of the turning plate 47 and located between the slots 47b. These guide holes 47g guide a rotation of the holding member relative to the turning plate 47.

As shown in FIGS. 12–14, each claw 45 has a body 45a (e.g., a substantially rectangular plate), and shafts (e.g., circular columns) on top and bottom end surfaces of the body 45a. Fore end 45b of the body 45a forms a sharp angle. That is, each of the claws 45 in the device M2 is dimensioned such that the fore end 45b is projected into the pass through hole 47a in the turning plate 47 when the claw 45 is rotated about the shafts 45g (which are parallel to the rotation center X). This is accomplished by disposing the upper and lower shafts 45g approximately midway between an origin side (convex portion 45c and 45e side, see FIGS. 15 and 17) and the fore end 45b side. The body 45a has a height h2 (see FIG. 12) which is slightly smaller than a height h3 (see FIG. 13) of the spacer 43 of the holding member 40.

As shown in FIGS. 12 and 13, the holding member 40 of the device M2 has a center of rotation which is concentric with the turning plate 47. The holding member 40 includes two sheets of disks 41, 42, three pieces of spacers, and six connecting bolts for connecting the above. Each of the disks 41, 42 has an outside diameter which is dimensioned such that the disks 41, 42 are rotatable in the inner circumference of the ribs 47f on the top and bottom of the turning plate 47. Each of the disks 41, 42 also includes a pass through hole 41a, 42a which has an inside diameter which is equal to the diameter of the pass through hole 47a in the turning plate 47 (i.e., slightly greater than the outside diameter of the electrode tip 4). Each of the disks 41, 42 has a tapered surface 41b, 42b at an edge of the pass through hole 41a, 42a in a surface facing outside of the disk for facilitating easy insertion of the electrode tips 4 from top and bottom thereof. The disks 41, 42 also have three holding holes 41c, 42c and three fitting holes 41e, 42e located around each of the pass through holes 41a, 42a opposite each other respectively in concentric and radial direction. The holding holes 41e, 42e rotatably hold the claws 45 by receiving the upper and lower shafts 45g of the claws 45 and act as rotation action surfaces 41d, 42d which receive a rotation torque when a portion of an inner circumference of the holding holes 41c, 42c is rotated together with the turning plate 47 turning in a regular (e.g., clockwise) direction. That is, the bearing surfaces 41d, 42d are surfaces in the inner circumference of the holding holes 41c, 42c facing a counterclockwise direction when the rotation center X of the turning plate 47 is taken as the center of rotation. Each of the fitting holes 41e, 42e has a stepped surface for receiving a head of the connecting bolt 44. This stepped surface is created by forming an inside diameter of a first inside portion smaller than the inside diameter of a second inside portion of the holes 41e, 42e.

The disk 41 has a thickness t2 (see FIG. 13) which is greater than a height h4 of the rib 47f on the top surface of the turning plate 47. As a result, an outer circumference surface projecting above the rib 47f becomes a braking surface 41f interacting with the compression piece portion 32a on the brake arms 32. The thickness of the disk 42 is equal to a height of the rib 47f on the bottom side of the turning plate 47. Each of the spacers 43 have a cylindrical form with an outside diameter dimensioned so that the spacer can be inserted in the guide hole 47g. Each spacer 43 has a thread hole 43a for receiving the connecting bolt 44 in an inner circumference thereof. As already explained, each of the spacers 43 has a height h3 (see FIG. 13) which is slightly greater than a height h2 of the body 45a of the claw 45, and which is slightly greater than a thickness t3 of the inner circumference of the ribs 47f on the turning plate 47.

The process for assembling the fore end portion 13 in the device M2 will now be explained. Under a condition the turning plate 47 and the intermediate gear 29 are disposed between the upper and lower cases 15, 16, the compression rings 18 are fitted to the upper and lower cases 15, 16 with bolts (not shown), and the bolts are passed through the connecting holes 15d, 16d to connect the upper and lower cases 15, 16 to each other. Then, the claws 45 are disposed in the slots 47b in the turning plate 47. At the same time, the spacers 43 are disposed in the guide holes 47g in the turning plate 47, and the disks 41, 42 are disposed in the turning plate 47 from above and below, respectively. Then, the fitting holes 41e, 42e and the thread holes 43a in the spacers 43 are matched, and the shafts 45g are inserted in the holding holes 41c, 42c. When the connecting bolts 44 are screwed into the thread holes 43a through the fitting holes 41e, 42e, the disks 41, 42 and the three spacers 43 are connected to assemble the holding member 40 as well as to dispose the holding member 40 in the turning plate 47 in a fashion to pass through the turning plate 47. In this instance, because each of the spacers 43 in the holding member 40 has a height h3 slightly greater than a height h2 of the body 45a of each of the claws 45 and a thickness t3 of an inner circumference of each of the ribs 47f on the turning plate 47, each of the claws 45 is rotatably held by the holding member 40 centered on the shafts 45g. The holding member 40 is secured within the case 14 by the rib 47f, the guide holes 47g, and the like such that the holding member 40 can make a relative movement with the turning plate 47 by matching the center of rotation X with the turning plate 47. The assembly of the fore end 13 is completed by fitting the brake arm 32 to the case 14 with the holding bolt 33, bringing the compression piece portions 32a into contact with the braking surfaces 41f on the disk 41 of the holding member 40, and locating the compression coil spring 34 between the spring seats 32b. It is preferable that, after the fore end portion 13 is assembled, the intermediate gear 29 and the driving gear 12 are engaged, and the fore end portion 13 and the body 10 are assembled.

Figure 15:
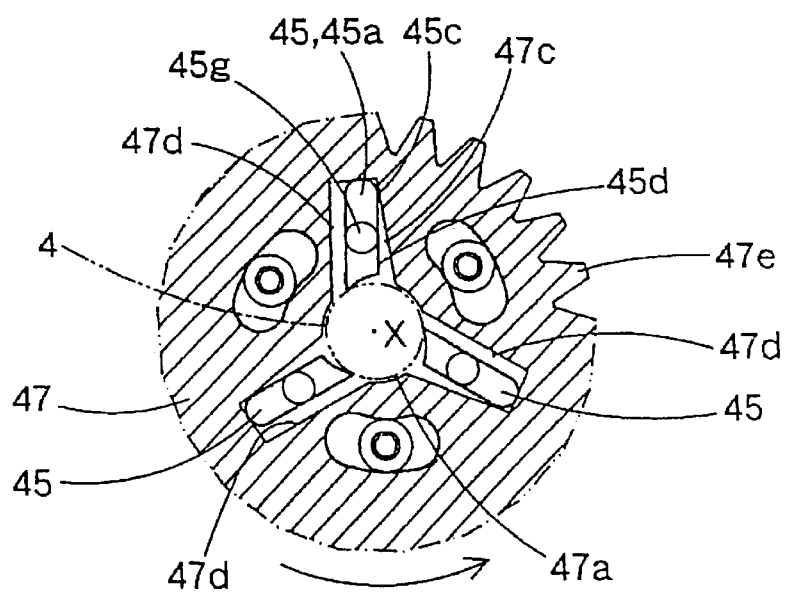
FIG. 15 is a view similar to FIG. 14, but showing a state immediately after a clockwise turn of the turning plate.
Figure 16:
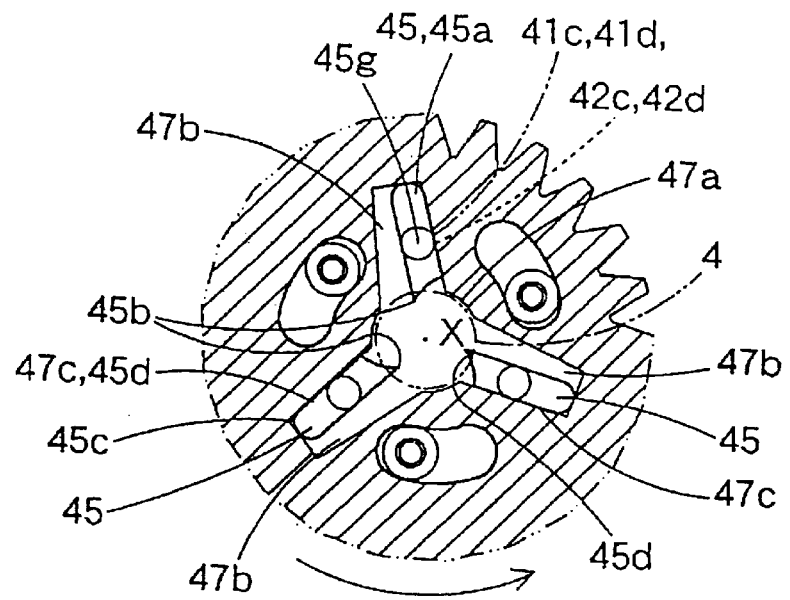
FIG. 16 is a view similar to FIG. 14, but showing a state right before rotation of a holding member.

As shown in FIGS. 14–17, when the device M2 is employed to remove the electrode tip 4, the turning plate 47 is placed around the electrode tip 4 such that the electrode tip 4 is inserted in the pass through hole 47a in the holding member 40. The driving motor in the body 10 is then driven to turn the turning plate 47 in a counterclockwise direction with reference to the center of rotation X via the driving gear 12 and the intermediate gear 29. Then, as shown in FIGS. 14 and 15, the engagement pressing surface 47c of the turning plate 47 is brought into contact with the convex portion 45c and side surface 45d of each of the claws 45. Each of the claws 45, therefore, turns in the counterclockwise direction about their shafts 45g until, as shown in FIG. 16, each of the claws 25 rotates into the engagement region where the fore end 45b of each of the claws 45 engages with the outer circumference of the electrode tip 4 to thereby hold the electrode tip 4 in the pass through hole 47a. Under this condition, if the turning plate 27 is rotated further in the regular (i.e., counterclockwise) direction, the fore end 45b of each of the claws 45 is directed toward a center direction of the electrode tip 4, making a deeper engagement with the electrode tip 4 with a greater resistance of engagement of the claws 25. When rotation of the claws 45 become difficult, the turning plate 47 exerts a torque on the rotating action surfaces 41d, 42d, (which are a supporting portion of each of the claws 25) so that the holding member 40 is rotated in the regular (i.e., counterclockwise) direction together with the turning plate 47 against a resistance of a rotation braking force generated by the brake arms 32. As the holding member 40 rotates with each of the claws 25 engaging the electrode tip 4, the electrode tip 4 is rotated in a counterclockwise direction which is a regular rotating direction of the turning plate 47. Because even a slight rotation of the electrode tip 4 releases the fitting between the tapered shaft 3 of the shank 1 and the electrode tip 4, if the fore end portion 13 is moved downward together with the body 10 from the fore end side of the shank 1, the electrode tip 4 can be removed from the shank 1. After the fore end portion 13 is brought over a collection box (not shown), the driving motor in the body 10 is reversed, thereby causing a reverse rotation of the turning plate 27 and the holding member 40 (i.e., in a clockwise direction with reference to the rotation center X). Then, as shown in FIG. 17, the disengagement pressing surfaces 47d of the turning plate 47 come into contact with the convex portion 45e and the side surface 45f of each of the claws 45, to rotate the claws 45 in a clockwise direction taking the shaft 45g as a rotation center so that the fore end 45b of each of the claws 45 releases the electrode tip 4 in the pass through hole 47a and enters the disengagement region. When the electrode tip 4 is released from the engagement of the fore end 45b of each of the claws 45, it is dropped from the pass through hole 47a in the turning plate 47 into the collection box. After reversing the rotation of the turning plate 47 reduces the engagement resistance of each of the claws 45, the holding member 40 is no longer rotated because the rotation braking force of the compression piece portions 32a in the brake arms 32 acts on the braking surfaces 41f. Continued rotation of the turning plate 47 rotates the claws 45 to the disengagement region.

The electrode tip 4 on the lower shank 2 can also be collected into the collection box with ease in a manner similar to the electrode tip 4 on the upper shank 1 if the fore end portion 13 is brought around the electrode tip 4, the turning plate 47 is rotated in a regular direction, the fore end portion is moved to a required position, and the turning plate 47 is reversed.

From the foregoing, persons of ordinary skill in the art will appreciate that the device M2 can be made slim to permit easy removal of the electrode tip 4 fitted in a tight space between the shanks 1 and 2. Since what is required in the removal of the electrode tip 4 is a simple engagement of the fore end 45b of the claws 45 with the electrode tip 4, there is no noise from impact, and occurrence of noise during working is suppressed. Moreover, because the height of the brake arms 32 can be restricted to be within the height of the outer circumferences 41f, and because portions of the braking device 31 other than the brake arms 32 can be disposed away from the vicinity of the electrode tip 4, a thickness of the portion in the vicinity of the electrode tip 4 in the removing device M2 can be made, not thick, but slim, to permit easy removal of the electrode tip 4 fitted in the tight space between the shanks 1 and 2. Moreover, in the device M2, three claws 45 are provided in an inner circumference of the pass through hole 47a in the turning plate 47 in radial directions. As a result, since the fore ends 45b of the claws engage with the electrode tip 4 substantially equally in a circumference of the electrode tip 4, tilting of the electrode tip 4 is prevented, and deformation of the tapered shaft 3 on the shanks 1 and 2 can also be prevented. Though the illustrated device M2 includes three claws 45 provided on an inner circumference of the pass through hole 47a in the turning plate 47 in radial directions, persons of ordinary skill in the art will appreciate that four or more than four claws may be provided on the inner circumference of the pass through hole 47a without departing from the scope or spirit of the invention. As a variation of the first device M1, only one claw 45 with the fore end 45b projected slightly further than the claw of the second device M2 may be provided, so that the outer circumference of the electrode tip 4 presses the inner circumference of the pass through hole 47 opposite to the claw 45 when the fore end of the claw comes into engagement with the electrode tip. Further, as a variation of the device M1, only two claws 45 of the second device M2 can be used with no slot 47b for the rest of the claw 45 formed, so that the outer circumference of the electrode tip 4 presses the inner circumference of the pass through hole 47 when the fore ends of the claws come into engagement with the electrode tip.

Moreover, with regard to the rotation braking force of the brake arms 32 against the holding members 20, 40 in the first and second devices M1, M2, it is required that the holding member 20, 40 be turned together with the turning plate 27 in a regular direction against the rotation braking force of the brake arms 32 when the fore end 25b, 45b of the claw 25, 45 is deeply engaged with the electrode tip 4 to increase a claw engagement resistance. This leads to difficulty in rotating the claw 25, 45 such that the rotation torque of the turning plate 27, 47 acts on the rotation action surfaces 21d, 22e, 41d, 42d on the supporting portion of the claw 25, 45. To do this, it is required that a compression force of the spring 34 be adjusted appropriately such that the rotation braking force of the brake arm 32 is not excessive for turning the turning plate 27, 47 in a regular direction by the holding member 20, 40 before the fore end 25b, 45b of the claw 25, 45 is directed to a center direction of the electrode tip 4 (before the first engagement with the electrode tip 4).

The disclosed devices for removing an electrode tip brings the turning plate around the electrode tip such that the electrode tip is inserted into the pass through hole in the turning plate, and turns the turning plate in a regular direction. Then, the engagement compression surface of the turning plate is brought into contact with the claw to rotate the claw to an engagement region, such that the fore end of the claw is engaged with the outer circumference of the electrode tip, holding the electrode tip within the pass through hole. If the turning plate is rotated in a regular direction further, increased claw engagement resistance is encountered, and the holding member receives a rotating torque from the regular rotating turning plate, (taking the supporting portion of the claw as a rotation action surface) sufficient to rotate the holding member in the regular direction against the rotation braking force together with the turning plate. That is, because the holding member rotates together with the claw when the holding member makes the claw engage with the electrode tip to hold the electrode tip in the pass through hole, the electrode tip rotates in a regular direction of the turning plate. Even if the electrode tip rotates slightly, the fitting state of the electrode tip to the tapered shaft of the shank is released. Accordingly, if the turning plate and the holding member and the like are moved toward a fore end of the shank, the electrode tip can be removed from the shank.

After the turning plate and the holding member are disposed at predetermined positions, the turning plate is reversed. Then, the disengagement compression surface of the turning plate is brought into contact with the claw, to rotate the claw until the fore end of the claw is disposed in the disengagement region, the hold on the electrode tip in the pass through hole is released, and the electrode tip drops from the pass through hole in the turning plate into a predetermined position. That is, since the reversing of the turning plate is a rotation in a direction in which the engagement resistance of the claw is reduced, the holding member is not rotated on receiving the rotation braking force, but only the turning plate is rotated to rotate the claw(s) to the disengagement region.

From the foregoing, person of ordinary skill in the art will appreciate that, in a case when one claw is provided and a dimension of an inner diameter of the pass through hole in the holding member or the turning plate is dimensioned such that an outer circumference of the electrode tip pressed by the claw can be pressed onto a portion of an inner circumference of the pass through hole opposite to the claw, the holding on the electrode tip in the pass through hole in the holding member or turning plate is a two point gripping between the fore end of the claw and the portion of the inner circumference of the pass through hole in contact with the electrode tip. A stable holding on the electrode tip is, therefore, made available. In this instance, if grooves are formed in the portion of the inner circumference of the pass through hole opposite to the claw when the claw is disposed in the engagement region, convex portions at edges of the grooves also can come into engagement with the electrode tip together with the fore end of the claw when the electrode tip is held. A more stable holding on the electrode tip is, therefore, made available. In a case when three or more than three claws are provided on the inner circumference of the pass through hole in radial directions, since the fore ends of the claws preferably make engagement with the electrode tip at substantially equal intervals in a circumferential direction of the outer circumference of the electrode tip, tilting of the electrode tip is prevented, and deformation of the tapered shaft of the shank can, therefore, be prevented to the utmost.

It will be apparent to those of ordinary skill in the art that various modifications and variations can be made in the disclosed devices for removing an electrode tip of the present invention without departing from the spirit or scope of the invention. Thus, there is no intention of limiting the scope of this patent to the precise examples disclosed herein. On the contrary, it is intended that the present patent cover all devices falling within the scope of the appended claims and their equivalents.

What is claimed is:

1. A device for removing an electrode tip from a shaft of a resistance welder by turning the electrode tip comprising:

a holding member having a center of rotation, the holding member defining a first hole sized to receive the electrode tip;

a claw disposed adjacent the first hole and mounted for rotation between an engagement position wherein at least a portion of the claw is positioned within the first hole to secure the electrode tip within the first hole, and a disengagement position wherein the at least a portion of the claw is displaced from the first hole;

a turning plate having a center of rotation coincident with the center of rotation of the holding member, the turning plate defining a second hole at the center of rotation, the turning plate being structured to move the claw from the disengagement position to the engagement position to secure the electrode tip in the first hole when the turning plate rotates in a first direction and to move the claw from the engagement position to the disengagement position to release the electrode tip from the first hole when the turning plate rotates in a second direction opposite the first direction; and a brake operatively engaging the holding member to substantially secure the holding member against movement during at least a first phase of movement of the claw from the disengagement position toward the engagement position, wherein the holding member turns with the turning plate in the first direction after completion of the first phase of movement to turn the electrode tip.

2. A device as defined in claim 1 wherein the claw has an axis of rotation and the axis of rotation of the claw is substantially parallel to an axis of the first hole.

3. A device as defined in claim 1 wherein the first phase ends when the claw enters the engagement position.

4. A device as defined in claim 1 wherein the first and second holes are coincident with the centers of rotation of the turning plate and the holding member.

5. A device as defined in claim 1 wherein the second hole is sized to receive a portion of the holding member, the holding member includes an end portion projecting from the turning plate, and the brake cooperates with the end portion to apply the braking force to the holding member.

6. A device as defined in claim 5 wherein the brake comprises:
   a pair of brake arms engaging an outer surface of the end portion of the holding member; and
   a spring biasing the brake arms into frictional engagement with the end portion.

7. A device as defined in claim 1 wherein the first hole has an inner wall and an inner diameter, the inner diameter being sized such that, when the claw is in the engagement position and engages the electrode tip, a side of the electrode tip frictionally engages a portion of the inner wall.

8. A device as defined in claim 7 wherein grooves are formed in the portion of the inner wall.

9. A device as defined in claim 8 wherein the device includes only one claw and the portion of the inner wall is located opposite the claw.

10. A device as defined in claim 1 wherein the claw comprises at least three claws, and the claws are spaced around the first hole such that, when the claws enter their engagement positions, the electrode tip is secured between the claws.

11. A device as defined in claim 1 further comprising a motor operatively coupled to the turning plate for rotating the turning plate in at least one of the first and second directions.

12. A device as defined in claim 11 wherein the turning plate includes gear teeth, and the motor is operatively coupled to the gear teeth of the turning plate via at least one intermediate gear.

13. A device as defined in claim 1 wherein the first hole is positioned to receive the electrode tip from two directions.

14. A device for removing an electrode tip from a shaft of a resistance welder by turning the electrode tip comprising:
   a holding member defining a first hole;
   a claw disposed adjacent the first hole and mounted for rotation between an engagement position wherein at least a portion of the claw is positioned within the first hole to secure the electrode tip within the first hole, and a disengagement position wherein the at least a portion of the claw is displaced from the first hole;
   a turning plate cooperating with the claw to move the claw from the disengagement position to the engagement position to secure the electrode tip in the first hole when the turning plate rotates in a first direction and to move the claw from the engagement position to the disengagement position to release the electrode tip from the first hole when the turning plate rotates in a second direction opposite the first direction; and
   a brake operatively engaging the holding member such that, during a first phase of operation, the holding member does not rotate and the turning plate moves the claw from the disengagement position toward the engagement position, and during a second phase of operation, the holding member rotates with the turning plate to rotate the electrode tip.

15. A method of removing an electrode tip from a shaft of a resistance welder by turning the electrode tip, the method comprising the steps of:
   inserting the electrode tip into a bore defined in at least one of a turning plate and a holding member;
   rotating the turning plate in a first direction without rotating the holding member to thereby move at least one claw into engagement with the electrode tip to secure the tip within the bore; and
   subsequently rotating the turning plate and the holding member in the first direction while the at least one claw secures the electrode tip in the bore to thereby turn the tip.

16. A method as defined in claim 15 further comprising the steps of:
   rotating the turning plate and the holding member in a second direction opposite the first direction to release the electrode tip from the bore.

* * * * *